(12) United States Patent
Chou

(10) Patent No.: US 9,267,545 B2
(45) Date of Patent: Feb. 23, 2016

(54) BEARING RETAINING STRUCTURE

(75) Inventor: Chu-Hsien Chou, New Taipei (TW)

(73) Assignee: ASIA VITAL COMPONENTS CO., LTD., New Taipei (TW)

( * ) Notice: Subject to any disclaimer, the term of this patent is extended or adjusted under 35 U.S.C. 154(b) by 948 days.

(21) Appl. No.: 13/469,688

(22) Filed: May 11, 2012

(65) Prior Publication Data

US 2013/0301964 A1 Nov. 14, 2013

(51) Int. Cl.
*F16C 32/06* (2006.01)
*F16C 35/00* (2006.01)

(52) U.S. Cl.
CPC ...................................... *F16C 35/00* (2013.01)

(58) Field of Classification Search
CPC .......... F16C 35/00; F04D 25/062; H02K 5/16
See application file for complete search history.

(56) References Cited

U.S. PATENT DOCUMENTS

| 4,682,065 | A | * | 7/1987 | English et al. | 384/536 |
| 5,343,104 | A | * | 8/1994 | Takahashi et al. | 310/90 |
| 2008/0063527 | A1 | * | 3/2008 | Yeh et al. | 416/174 |
| 2009/0256441 | A1 | * | 10/2009 | Horng et al. | 310/90 |
| 2012/0194009 | A1 | * | 8/2012 | Horng | 310/43 |

* cited by examiner

*Primary Examiner* — Thomas R. Hannon

(57) ABSTRACT

A bearing retaining structure includes a base, a stator assembly and a bearing. The base has a bearing cup projected from one side thereof, and the bearing cup internally defines a receiving space and has a fixed end connected to the base and an opposite free end. The bearing is disposed in the receiving space of the bearing cup. The stator assembly has an axially extended central opening and a retaining portion radially inward protruded from an inner wall surface of the central opening. The stator assembly is externally mounted around the bearing cup with the retaining portion tightly fitted around the free end of the bearing cup to narrow the receiving space, so that an inner wall surface of the receiving space is in tight contact with an outer wall surface of the bearing, and the bearing is stably retained in the bearing cup.

4 Claims, 5 Drawing Sheets

BEARING RETAINING STRUCTURE

FIELD OF THE INVENTION

The present invention relates to a bearing retaining structure, and more particularly to a bearing retaining structure that is able to effectively hold a bearing in place in a bearing cup and to increase the fitting accuracy between an outer wall surface of the bearing and an inner wall surface of the bearing cup.

BACKGROUND OF THE INVENTION

An electronic product internally includes electronic elements that would produce a lot of heat during operation thereof. In the event the electronic elements are always in a high-temperature state, they will have lowered operating efficiency or even become burned-out. To protect the electronic elements from poor operating efficiency or burnout, at least a heat dissipating unit, such as a radiating fin assembly or a heat sink, and a fan are usually used together to dissipate the heat produced by the electronic elements, so as to prolong the service life of the electronic elements.

Conventionally, to enable convenient assembling of a fan, the bearing of the fan is associated with the bearing cup by way of loose-fit, and the rotary shaft of the blade assembly of the fan is also loosely fitted in the central hole of the bearing. While the loose-fit between the bearing and the bearing cup enables quick assembling of the fan, the bearing will vibrate relative to the bearing cup and produce noise during the operation of the fan.

To overcome the problem of vibration the bearing relative to the bearing cup, there are generally two ways to retain the fan bearing in place in the bearing cup. The first way is to injection mold the bearing and the bearing cup at the same time using plastic materials, and the second way is to manufacture the bearing and the bearing cup with metal materials and assemble them by way of tight-fit. The second way provides higher fitting accuracy between the metal bearing and bearing cup, but requires higher machining cost.

On the other hand, the forming of the bearing along with the bearing cup through plastic injection molding as suggested in the first way can be achieved at lower cost but it provides only relatively lower fitting accuracy between the bearing and the bearing cup. That is, a too tight fitting of the bearing in the bearing cup tends to cause bore shrinkage of the bearing, while a too loose fitting of the bearing in the bearing cup fails to effectively retain the bearing in place in the bearing cup.

In brief, the prior art bearing retaining structure for fans has the following disadvantages: (1) having poor fitting accuracy between the plastic injection molded bearing and bearing cup; (2) requiring higher cost to manufacture metal bearing and bearing cup with higher fitting accuracy between them; and (3) the assembled plastic bearing and bearing cup tending to produce vibration and noise during fan operation.

SUMMARY OF THE INVENTION

A primary object of the present invention is to provide a bearing retaining structure that is able to increase the fitting accuracy between a bearing and a bearing cup and to reduce the cost for assembling the bearing to the bearing cup.

To achieve the above and other objects, the bearing retaining structure according to the present invention includes a base, a bearing, and a stator assembly.

The base has a bearing cup projected from one side thereof, and the bearing cup internally defines a receiving space and has a fixed end connected to the base and an opposite free end. The bearing is disposed in the receiving space of the bearing cup. The stator assembly has an axially extended central opening and a retaining portion radially inward protruded from an inner wall surface of the central opening. The stator assembly is externally mounted around the bearing cup with the retaining portion tightly fitted around the free end of the bearing cup to narrow the receiving space, so that an inner wall surface of the receiving space is in tight contact with an outer wall surface of the bearing, and the bearing is stably retained in the bearing cup.

With the bearing retaining structure of the present invention, the bearing and the bearing cup can have an increased fitting accuracy between them and be manufactured at reduced cost.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
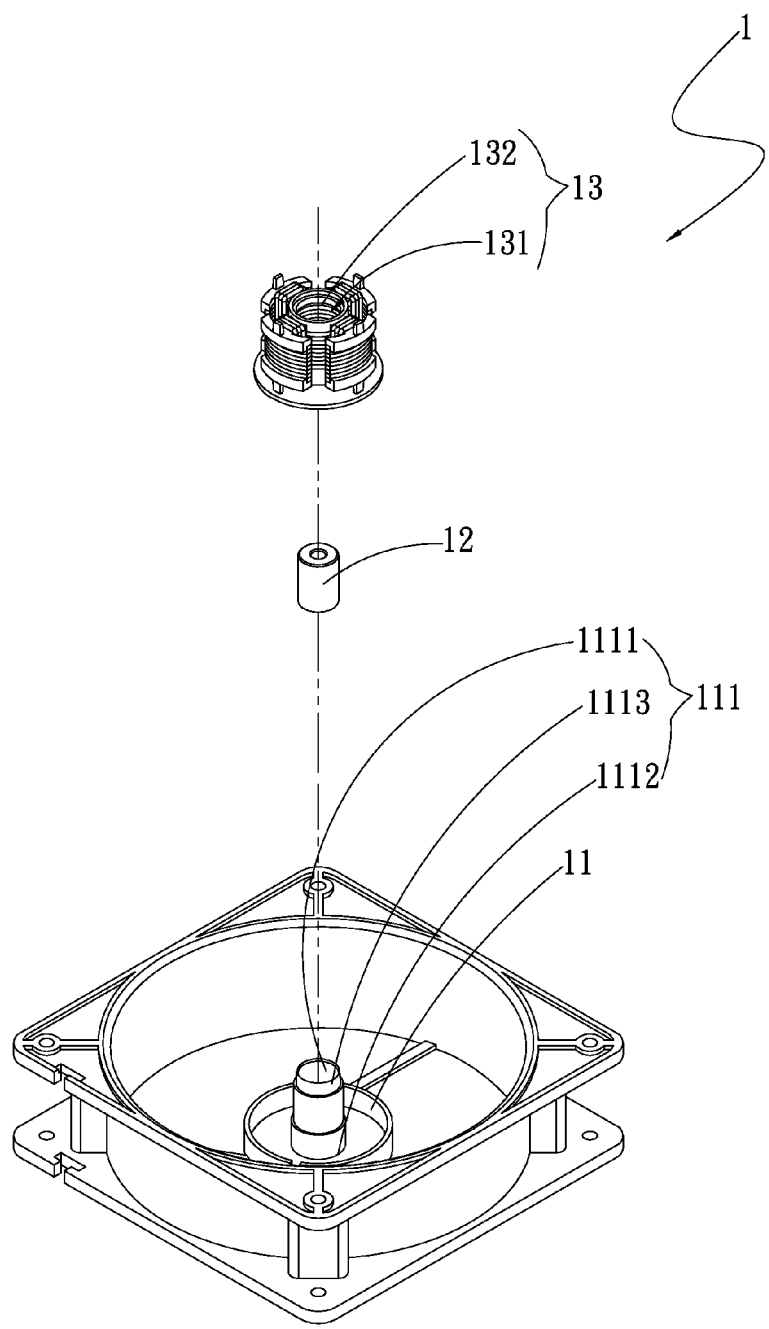
FIG. 1 is an exploded perspective view of a bearing retaining structure according to a first embodiment of the present invention.

The present invention will now be described with some preferred embodiments thereof and with reference to the accompanying drawings. For the purpose of easy to understand, elements that are the same in the preferred embodiments are denoted by the same reference numerals.

Figure 2:
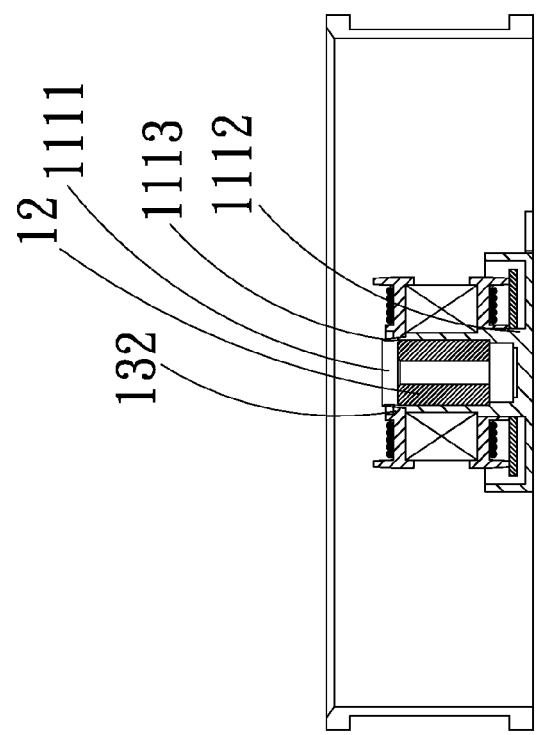
FIG. 2 is an assembled sectional view of the bearing retaining structure of FIG. 1.

Please refer to FIGS. 1 and 2 that are exploded perspective view and assembled sectional view, respectively, of a bearing retaining structure 1 according to a first embodiment of the present invention. As shown, the bearing retaining structure 1 in the first embodiment includes a base 11, a bearing 12, and a stator assembly 13.

The base 11 has a bearing cup 111 projected from one side thereof. The bearing cup 111 internally defines a receiving space 1111, and has a fixed end 1112 and an opposite free end 1113. The fixed end 1112 is connected to the base 11. The bearing 12 is disposed in the receiving space 1111 of the bearing cup 111.

The stator assembly 13 has an axially extended central opening 131 and a retaining portion 132. The retaining portion 132 is radially inwardly protruded from an inner wall surface of the central opening 131 to fit around the free end 1113 of the bearing cup 111 and accordingly brings an inner wall surface of the receiving space 1111 to tightly contact with an outer wall surface of the bearing 12.

The fixed end 1112 has an inner diameter larger than that of the free end 1113. That is, the bearing cup 111 is forwardly tapered from the fixed end 1112 toward the free end 1113. When the bearing 12 is disposed in the receiving space 1111 and the stator assembly 13 is externally mounted around the bearing cup 111, the retaining portion 132 of the stator assembly 13 will at the same time correspondingly hoop the free end 1113 of the bearing cup 111. In other words, when the bearing 12 is disposed in the receiving space 111 of the bearing cup 111, the diameter-reduced free end 1113 of the bearing cup 111 will apply a preliminary radially inward fastening force to the bearing 12; and then, when the stator assembly 13 is further mounted around the bearing cup 111, the retaining portion 132 of the stator assembly 13 will apply an additional radially inward fastening force to the free end 1113, so that an increased fitting accuracy between the bearing cup 111 and the bearing 12 can be obtained to prevent the occurrence of vibration of the bearing 12 in the bearing cup 111.

Figure 3A:
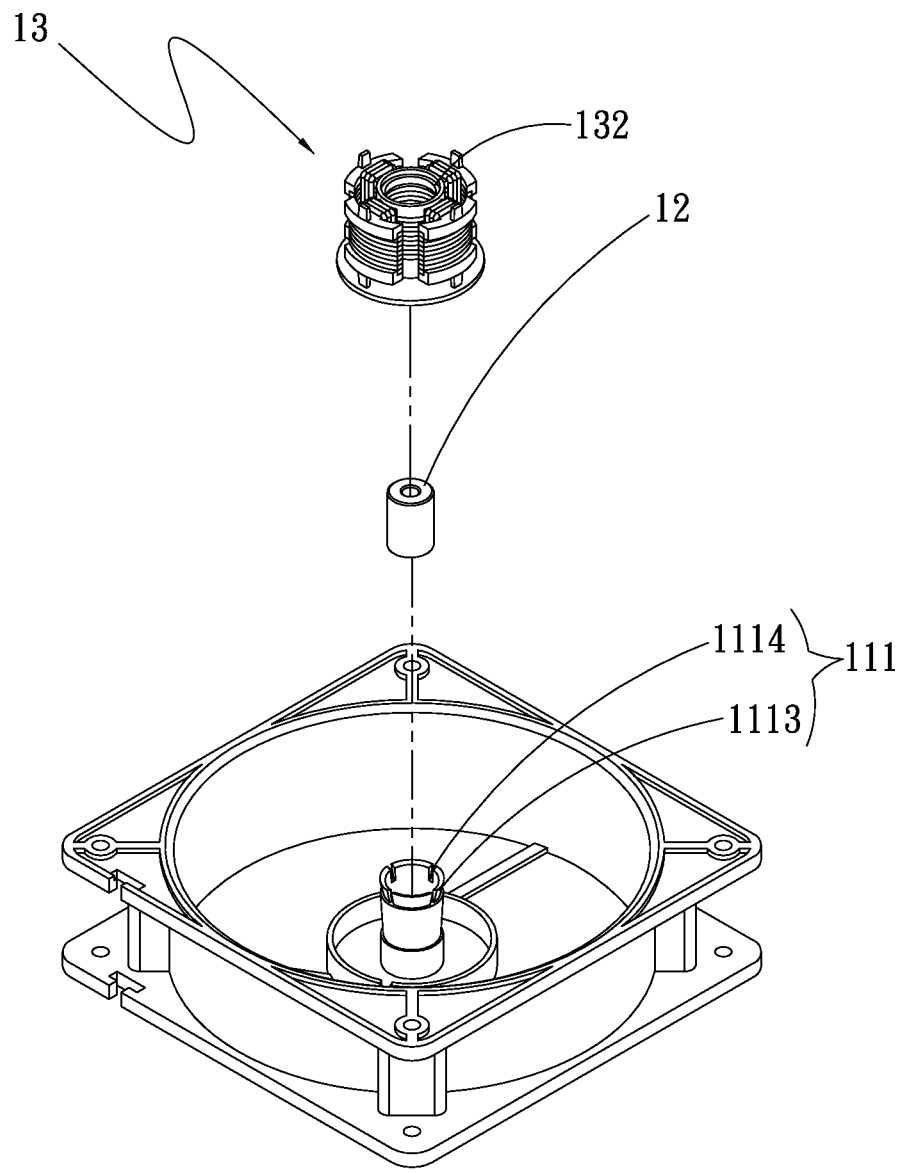
FIG. 3A is an exploded perspective view of a bearing retaining structure according to a second embodiment of the present invention.
Figure 3B:
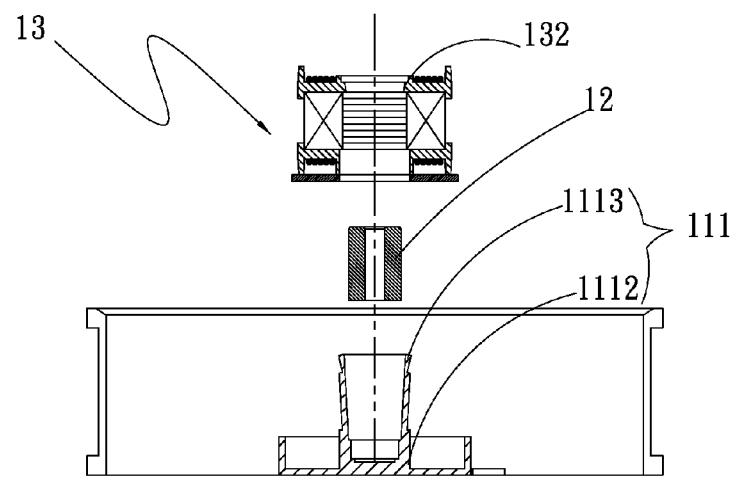
FIG. 3B an exploded sectional view of the bearing retaining structure of FIG. 3A.
Figure 3C:
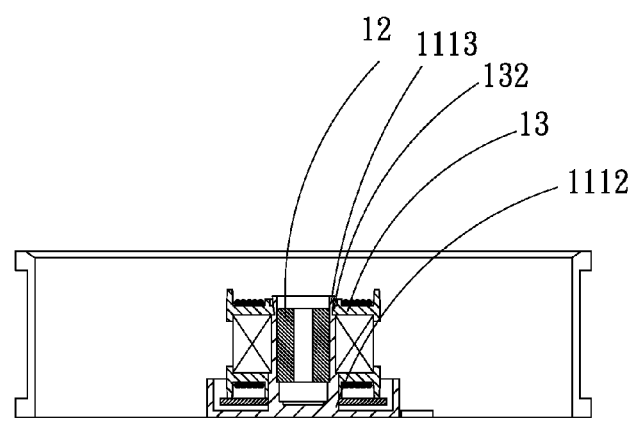
FIG. 3C is an assembled view of FIG. 3B.

Please refer to FIGS. 3A, 3B and 3C, which are exploded perspective view, exploded sectional view and assembled sectional view, respectively, of a bearing retaining structure according to a second embodiment of the present invention. As shown, the second embodiment is generally structurally similar to the first embodiment, except that, in the second embodiment, the fixed end 1112 has an inner diameter smaller than that of the free end 1113. Similarly, when the stator assembly 13 is mounted around the bearing cup 111, the retaining portion 132 of the stator assembly 13 will apply a radially inward fastening force to the free end 1113 of the bearing cup 111, so that the receiving space 1111 in the bearing cup 111 is narrowed to thereby tightly hold the bearing 12 therein, and an increased fitting accuracy between the bearing cup 111 and the bearing 12 can be obtained accordingly. Meanwhile, the cost for assembling the bearing 12 to the bearing cup 111 can be reduced.

Further, the free end 1113 of the bearing cup 111 has at least one axially extended cut 1114 formed thereat, or the free end 1113 of the bearing cup 111 can be claw-shaped, so that the free end 1113 has a certain degree of elasticity in the radial direction to facilitate easy disposition of the bearing 12 into the bearing cup 111 and convenient mounting of the stator assembly 13 around the bearing cup 111 for the retaining portion 132 to apply the radially inward fastening force to the free end 1113.

Figure 4:
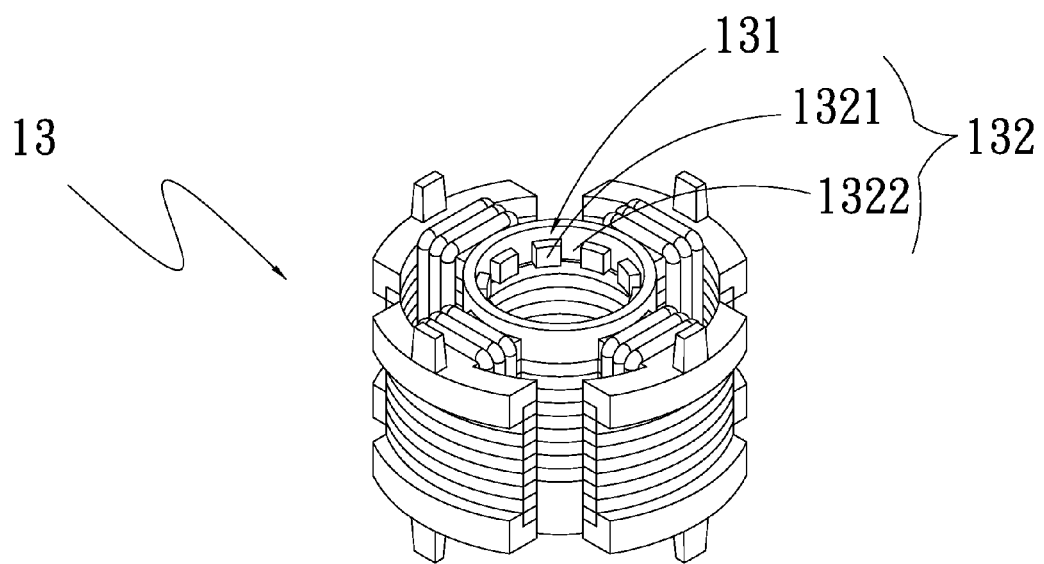
FIG. 4 is a perspective view of a stator assembly for a bearing retaining structure according to a third embodiment of the present invention.

FIG. 4 is a perspective view of a stator assembly 13 for a bearing retaining structure according to a third embodiment of the present invention. As shown, the stator assembly 13 in the third embodiment is generally structurally similar to that in the first embodiment, except that, in the third embodiment, the retaining portion 132 includes a plurality of alternately spaced radially inward protrusions 1321 and radially outward recesses 1322. The protrusions 1321 respectively have a radially outer end connected to the inner wall surface of the central opening 131 and a radially inner end extended away from the inner wall surface of the central opening 131.

Figure 5:
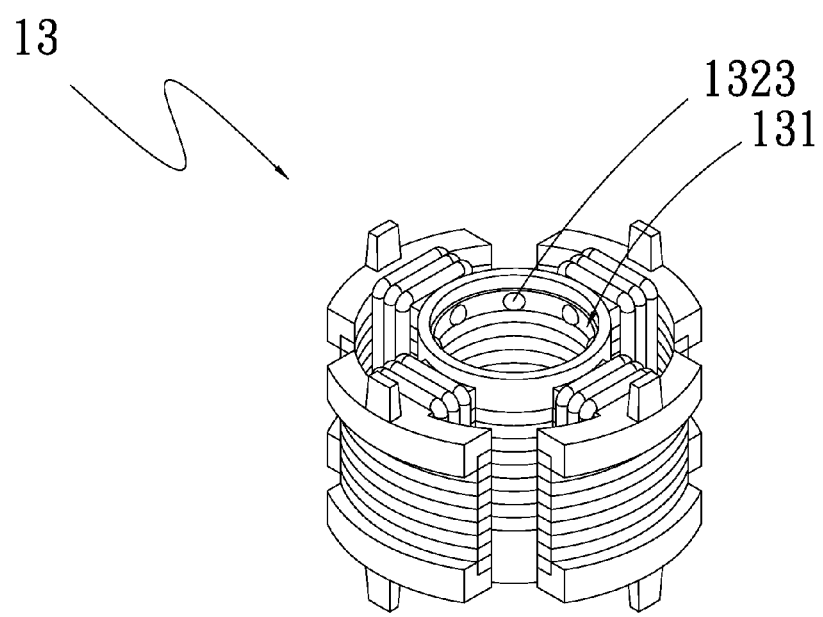
FIG. 5 is a perspective view of a stator assembly for a bearing retaining structure according to a fourth embodiment of the present invention.

Please refer to FIG. 5 that is a perspective view of a stator assembly 13 for a bearing retaining structure according to a fourth embodiment of the present invention. As shown, the stator assembly 13 in the fourth embodiment is generally structurally similar to that in the first embodiment, except that, in the fourth embodiment, the retaining portion 132 includes a plurality of spaced and radially inward protruded dots 1323. The dots 1323 may be equally or irregularly spaced from one another. In the illustrated fourth embodiment of the present invention, the dots 1323 are equally spaced from one another without being limited thereto.

In the above-described first to fourth embodiments, the bearing 12 can be an oil-impregnated bearing or a ball bearing, and the bearing 12 has an outer wall surface in tight contact with the inner wall surface of the receiving space 1111.

With the bearing retaining structure according to the present invention, an increased fitting accuracy between the bearing 12 and the bearing cup 111 can be obtained to avoid vibration of the bearing 12 in the bearing cup 111, and it is not necessary to subject the bearing cup 111 to any second-time machining to thereby reduce the manufacturing cost of the bearing cup 111.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A bearing retaining structure, comprising:
   a base having a bearing cup projected from one side thereof, the bearing cup internally defining a receiving space and having a fixed end and an opposite free end; and the fixed end being connected to the base;
   a bearing being disposed in the receiving space of the bearing cup; and
   a stator assembly having an axially extended central opening and a retaining portion; the retaining portion being radially inwardly protruded from an inner wall surface of the central opening to fit around the free end of the bearing cup and accordingly bringing an inner wall surface of the receiving space to tightly contact with an outer wall surface of the bearing;
   wherein the fixed end of the bearing cup has an inner diameter larger than that of the free end; and
   wherein the retaining portion of the stator assembly includes a plurality of alternately spaced radially inward protrusions and radially outward recesses.

2. The bearing retaining structure as claimed in claim 1, wherein the bearing is selected from the group consisting of an oil-impregnated bearing and a ball bearing.

3. The bearing retaining structure as claimed in claim 1, wherein the free end of the bearing cup is formed with at least one axially extended cut.

4. A bearing retaining structure, comprising
   a base having a bearing cup projected from one side thereof, the bearing cup internally defining a receiving space and having a fixed end and an opposite free end; and the fixed end being connected to the base;
   a bearing being disposed in the receiving space of the bearing cup; and
   a stator assembly having an axially extended central opening and a retaining portion; and the retaining portion being radially inwardly protruded from an inner wall surface of the central opening to fit around the free end of the bearing cup and accordingly bringing an inner wall surface of the receiving space to tightly contact with an outer wall surface of the bearing;
   wherein the fixed end of the bearing cup has an inner diameter larger than that of the free end; and
   wherein the retaining portion of the stator assembly includes a plurality of radially inward protruded dots, and the dots being arranged in any one of two manners, namely, being equally spaced from one another and being irregularly spaced from one another.

\* \* \* \* \*